(12) United States Patent
Lamb et al.

(10) Patent No.: US 12,425,853 B2
(45) Date of Patent: *Sep. 23, 2025

(54) CELLULAR CONVERTER APPARATUS AND METHOD

(71) Applicant: The ADT Security Corporation, Boca Raton, FL (US)

(72) Inventors: Michael Lamb, Rancho Santa Fe, CA (US); Richard Camarillo, San Diego, CA (US); Timothy Thome, San Diego, CA (US); David Carey, Rancho Santa Fe, CA (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,760

(22) Filed: Jun. 18, 2024

(65) Prior Publication Data

US 2024/0340359 A1 Oct. 10, 2024

Related U.S. Application Data

(63) Continuation of application No. 16/926,086, filed on Jul. 10, 2020, now Pat. No. 12,047,476.

(60) Provisional application No. 62/872,627, filed on Jul. 10, 2019.

(51) Int. Cl.
*H04L 69/08* (2022.01)
*H04W 12/06* (2021.01)
*H04W 88/16* (2009.01)

(52) U.S. Cl.
CPC ............ *H04W 12/06* (2013.01); *H04L 69/08* (2013.01); *H04W 88/16* (2013.01)

(58) Field of Classification Search
CPC ..... H04W 12/06; H04W 88/16; H04W 60/00; H04W 92/02; H04W 52/0277; H04W 52/028; H04L 69/08; H04L 69/18; Y02D 30/70

See application file for complete search history.

(56) References Cited

U.S. PATENT DOCUMENTS

| 8,306,525 B2 * | 11/2012 | Feher ................ H04W 84/06 455/420 |
| 8,989,806 B2 * | 3/2015 | Brusilovsky .......... H04W 8/265 455/410 |
| 9,320,035 B2 | 4/2016 | Lin et al. |

(Continued)

FOREIGN PATENT DOCUMENTS

WO 2009055827 A1 4/2009

OTHER PUBLICATIONS

International Search Report and Written Opinion dated Oct. 14, 2020 for International Application No. PCT/US2020/041626 filed Jul. 10, 2020; consisting of 6 pages.

(Continued)

*Primary Examiner* — Abdullahi E Salad
(74) *Attorney, Agent, or Firm* — Weisberg I.P. Law, P.A.

(57) ABSTRACT

A cellular conversion apparatus, system and method is disclosed and described. A cellular conversion apparatus comprises circuitry for communicating with a first local cellular device and circuitry for communicating with a second wide-area cellular system, where the first local cellular device and the second wide-area cellular system use different communication protocols.

20 Claims, 3 Drawing Sheets (56) References Cited

U.S. PATENT DOCUMENTS

| | | | |
|---|---|---|---|
| 9,374,289 B2* | 6/2016 | Kotecha | H04W 28/0284 |
| 9,997,056 B2* | 6/2018 | Bleisch | H04M 11/04 |
| 10,514,837 B1* | 12/2019 | Li | G06F 3/0482 |
| 2010/0124920 A1* | 5/2010 | Feher | H04B 7/04 |
| | | | 455/426.1 |
| 2010/0208852 A1 | 8/2010 | Feher | |
| 2010/0263032 A1 | 10/2010 | Bhuyan et al. | |
| 2012/0149313 A1* | 6/2012 | Roh | H04B 1/006 |
| | | | 455/78 |
| 2013/0010773 A1 | 1/2013 | Hong et al. | |
| 2013/0036245 A1* | 2/2013 | Ma | H04W 88/02 |
| | | | 710/106 |
| 2013/0080641 A1* | 3/2013 | Lui | H04L 41/0886 |
| | | | 709/226 |
| 2013/0095820 A1* | 4/2013 | Yasuda | H04W 36/0088 |
| | | | 455/426.1 |
| 2013/0120131 A1* | 5/2013 | Hicks, III | G08B 25/007 |
| | | | 340/501 |
| 2013/0217437 A1* | 8/2013 | Liu | H04W 88/06 |
| | | | 455/552.1 |
| 2014/0071967 A1 | 3/2014 | Velasco et al. | |
| 2014/0073288 A1* | 3/2014 | Velasco | H04W 4/02 |
| | | | 455/411 |
| 2014/0143534 A1 | 5/2014 | Chastain et al. | |
| 2016/0150530 A1* | 5/2016 | Fujisaki | H04W 36/005 |
| | | | 370/329 |
| 2017/0019297 A1* | 1/2017 | Rakib | H04W 88/085 |
| 2017/0019397 A1* | 1/2017 | Kim | H04L 9/3268 |
| 2018/0212642 A1* | 7/2018 | Zhao | H04B 1/40 |
| 2019/0362080 A1* | 11/2019 | Achillopoulos | G06F 21/72 |

OTHER PUBLICATIONS

Supplementary European Search Report dated Jun. 28, 2023 for EP Application No. 20836719.3; consisting of 7 pages.

* cited by examiner

CELLULAR CONVERTER APPARATUS AND METHOD

CROSS-REFERENCE TO RELATED APPLICATIONS

This application is a Continuation of and claims priority to U.S. Utility patent application Ser. No. 16/926,086, filed Jul. 10, 2020, entitled CELLULAR CONVERTER APPARATUS AND METHOD, which claims priority to U.S. Provisional Patent Application No. 62/872,627, filed Jul. 10, 2019, entitled CELLULAR CONVERTER APPARATUS AND METHOD, the entireties of which are incorporated herein by reference.

BACKGROUND OF THE INVENTION

Millions of wireless communication devices today utilize "$3^{rd}$ generation" cellular voice and data services provided by well-known cellular carriers, such as AT&T, Verizon, Orange, Deutsche Telekom, and many others in the US and internationally. In the United States, two versions of 3G have been deployed: WCDMA, defined by the 3G Partnership Project (3GPP) and known as UMTS, and CDMA2000, defined by the 3G Partnership Project 2 (3GPP2). Both standards allow the wireless transmission of voice and data in the range of 80-100 kbits/sec.

3G networks include end-user 3G cellular devices (such as mobile phones, cellular modems, cellular data terminals, etc.), and a system of cellular base stations (or a radio network subsystem) coupled to a core network, which provides all the central processing and management for the system, such as authentication, encryption, roaming, billing, etc. The core network, in turn, is coupled to both a Mobile Switching Center for providing voice calls to the public switched telephone network (PSTN) and to an IP-based network, such as the Internet.

As time has progressed, newer and faster communication technologies have been developed. For example, 4G networks and devices based on the LTE (Long Term Evolution) standard have been available since around 2010, offering data rates as high as 100 Mbits/sec for high mobility devices. 5G networks are currently in development, offering data rates as high as 10 Gigabits/sec.

As these advanced technologies have been rolled out, and as 5G becomes commonplace, more and more 3G devices will be upgraded or replaced in order to take advantage of new capabilities offered by these technologies. As these devices are upgraded, cellular carriers have less and less incentive to keep their 3G networks active. In addition, cellular carriers can use valuable spectrum reserved for 3G for their new networks. In the United States, cellular carriers have already announced plans to decommission their 3G networks: AT&T by February 2022 and Verizon by December 2022. When carriers discontinue 3G service, core network functionality, such as authentication and billing, are discontinued. Once such functionality is discontinued, there is no way for a 3G device to authenticate itself to any network authentication center and, therefore, no way to communicate, even if the 3G device could communicate with a 3G cell tower. Similarly, in time, current 4G networks will inevitably be shut down, requiring upgrading or replacing 4G devices.

While upgrading to the newer wireless networks is relatively easy and inexpensive for many users, millions of other 3G devices are not so easily upgradable. For example, in the home security industry, millions of security panels use 3G as a primary or backup communication pathway. Upgrading or replacing these panels is not only expensive (hardware plus installation costs), but also time-constrained, as the number of panels in need of upgrading/replacement is in excess of 125,000 panels per month. Other industries, such as vending, utility, and automotive industries, will experience the same problem.

SUMMARY

One innovative solution to the aforementioned problem is to provide a cellular converter module, or gateway, to convert cellular signals in accordance with a first cellular protocol to cellular signals in accordance with an alternative wireless protocol. For example, 3G UMTS/CDMA2000 signals from a 3G device can be converted to signals in accordance with 4G LTE, 5G, Wi-Fi, Ethernet, or some other protocol. While the remainder of this disclosure discusses a 3G-4G converter module, it should be understood that the concepts described herein could be applied to a number of other converter modules, such as a 3G-5G converter module, a 4G-5G converter module, etc.

The cellular converter module described herein can be distributed by mail and installed simply by plugging it into a standard AC wall outlet by an end user. The module may be configured to automatically register itself with a network other than a 3G network upon first power-up, and then obtain 3G authentication and, in some cases, 3G operating information, as described later herein, in order to register and authenticate 3G device 100 with cellular converter module 104 and to instruct 3G device how to communicate with cellular converter module 104 using 3G cellular protocols. Once registered, or "provisioned", the cellular converter module authenticates a 3G device each time that the 3G device requests a communication with an end device, and then translates 3G wireless cellular signals, both packet-switched and circuit-switched, received from the 3G device into one or more different protocols for transmission over a "newer" network such as a 4G LTE network, 5G network, or the Internet.

BRIEF DESCRIPTION OF THE DRAWINGS

Embodiments of the present invention will be detailed subsequently referring to the appended drawings, in which.

DETAILED DESCRIPTION OF THE INVENTION

Embodiments of the invention are described below. It should be understood that any reference to a particular, alternative network or protocol other than 3G (such as LTE) could alternatively reference a different, alternative network or protocol other than 3G (such as 5G, CDMA2000, Ethernet, Wi-Fi, etc.).

Figure 1:
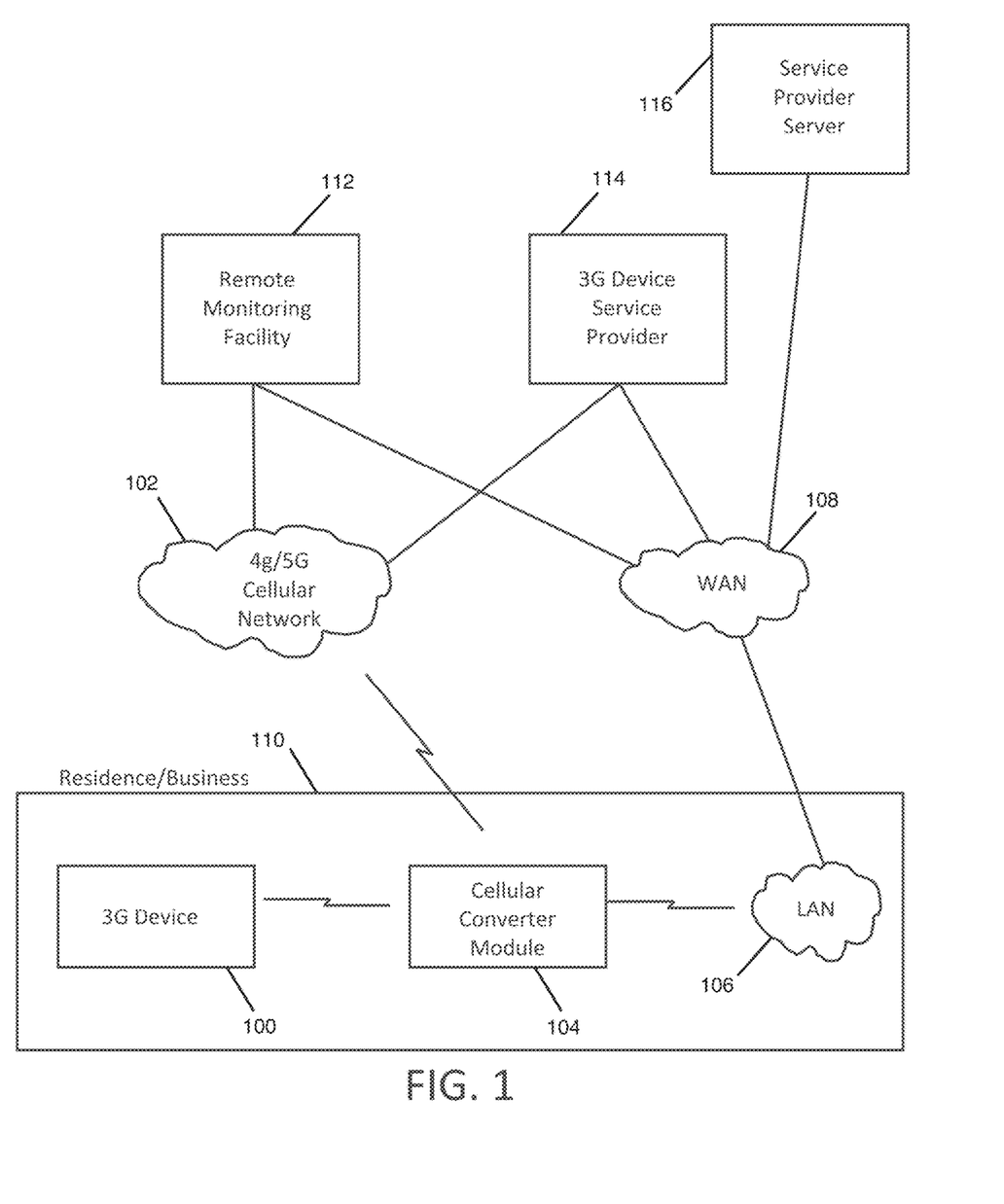
FIG. 1 illustrates a system for converting cellular 3G signals from a 3G-capabile device into signals compatible with different networks, such as a 4G LTE network, a 5G cellular network, or an IP-based network, such as the Internet, and vise-versa.

FIG. 1 illustrates a system for converting cellular 3G signals from a 3G-capable device 100 into signals compatible with different networks, such as a 4G LTE network or a 5G cellular network (either or both shown in FIG. 1 as network 102), or an IP-based network, such as the Internet, and vise-versa. 3G device 100 shown in FIG. 1 may be a 3G-capable home security panel, phone, data modem, set-top box, etc. In non-residential applications, 3G device 100 could be a 3G-capabile utility meter, vending machine, or even a vehicle. Cellular converter module 104 as shown in FIG. 1 acts as a translator between 3G device 100 and network 102, capable of 2-way voice and/or data communications with 3G device 100. Cellular converter module 104 is typically a small, consumer-grade electronic device that is powered by household AC, and may additionally comprise a backup battery in case of power outage.

In the case of a 3G home alarm system, a security panel (i.e., "brain" of the system that receives signals from sensors and alerts a security monitoring center 112) transmits cellular 3G data signals normally destined for a 3G cellular network, either in voice or data format. However, after the 3G network has been decommissioned, the security panel recognizes cellular converter module 104 as a 3G base station and continues to transmit and receive cellular signals, now with cellular converter module 104, as if the 3G network were still active. Signals from the security panel are generated when a trigger event is detected by the security system, such as when a door or window is opened while the system is in an armed state, upon transmission of a supervisory signal, or when some other condition is detected, such as a low battery condition of a sensor used in conjunction with the security system, loss of AC power, etc. Cellular converter module 104 receives a 3G cellular signal from the security panel (i.e., 3G device 100), converts it into a signal suitable for an alternative network, such as network 102, then transmits the converted signal to the network 102. In one embodiment, network 102 comprises an IP-based network, where cellular converter module 104 converts the 3G signal into an Ethernet or Wi-Fi signal and provide the converted signal to a local-area network (LAN) 106, which then forwards the signal to a WAN 108, such as the Internet. The converted signals are then provided to either security monitoring center 112, which alerts authorities in the event of a security breach, and/or to a security provider that installed the security system or a provider of security system components. In one embodiment, the signal comprises live audio of the area surrounding the security panel, or a component thereof, in residence/business 110 monitored by the security system.

Signals may also be provided from security monitoring center 112 and/or a security system service provider (or some other person or entity) in the form of voice signals (i.e., from a person at security monitoring center 112) or data (i.e., in the form of over-the-air firmware updates for the security panel from the security system service provider). Such signals are routed to the cellular converter module via one or more of the alternative networks (i.e., network 102, WAN 108, etc.), converted by cellular conversion module 104 into 3G cellular signals, and then transmitted wirelessly to the 3G security panel (i.e., 3G device 100). Such voice or data signals are routed to cellular converter module 104 using an identification code, such as a phone number or IP address, of cellular converter module 104, contained in each voice or data call setup request. Such an identification code is typically stored in a SIM card within cellular converter module 104. Similarly, cellular converter module 104 contacts the 3G security panel using an identification code stored on a SIM card inside the 3G security panel.

Figure 2:
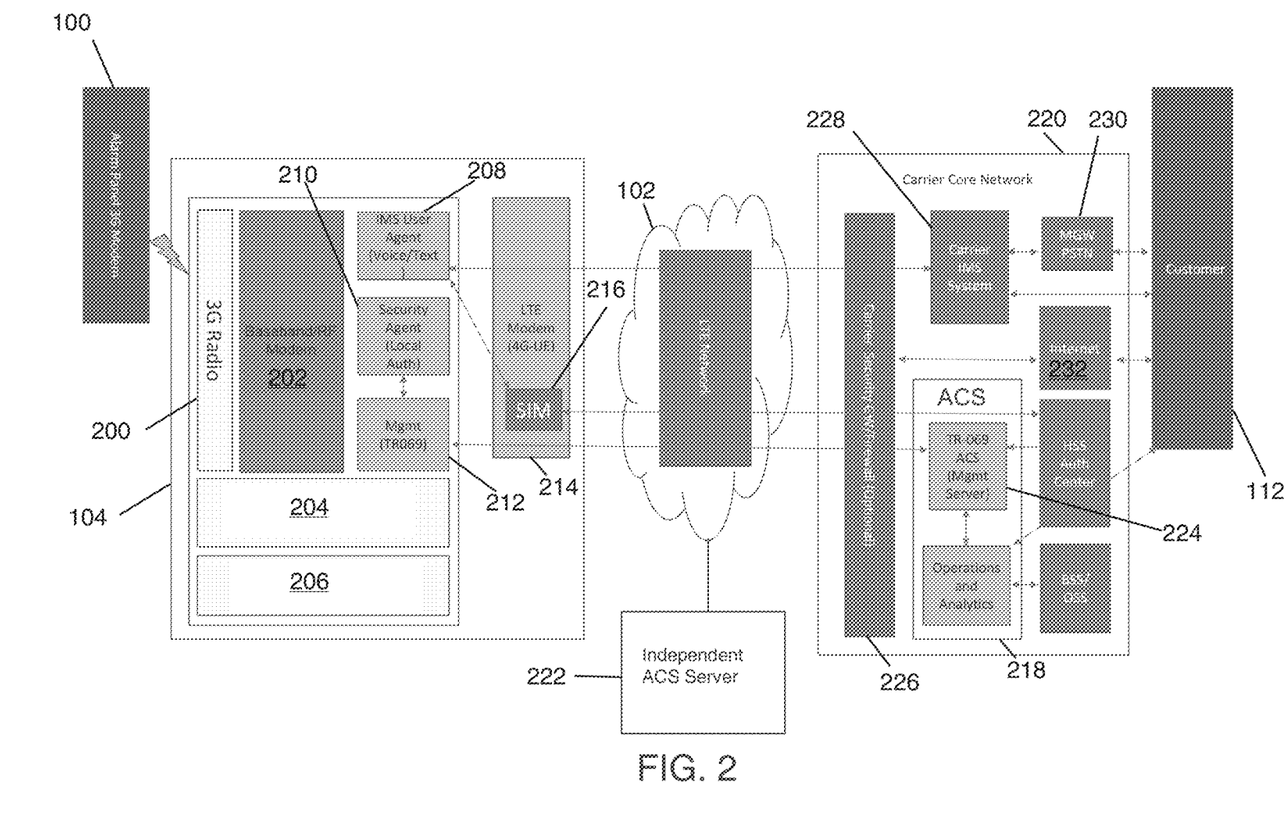
FIG. 2 illustrates a functional block diagram of one embodiment of the cellular conversion module as shown in FIG. 1 as used in connection with an alternative communication network, in this case a 4G LTE network.

FIG. 2 illustrates a functional block diagram of one embodiment of cellular converter module 104 as shown in FIG. 1 as used in connection with network 102, in this case a 4G LTE network. In this embodiment, cellular converter module 104 comprises a 3G transceiver 200, a baseband/rf modem 202, processor 204, electronic memory 206, an IMS User Agent 208, a security agent 210, a provisioning manager 212 (shown in FIG. 2 as a TR069 management agent), an alternative communication network modem and transceiver 214, and a SIM module 216. The electronic memory 206 comprises computer-executable instructions, executed by processor 204, to support the functionality of cellular converter module 104. Not shown is an optional backup battery that is used to power cellular converter module 104 when AC power is lost. Processor 204 comprises one or more digital signal processors commonly found in modern cellular communications equipment and/or one or more co-processors for performing tasks other than those related to cellular communications. Memory 206 comprises one or more electronic storage device, excluding transitory signals, for storing computer-executable code, 3G authentication/operating information, and other information, for operation of cellular converter module 104.

When cellular converter module 104 is first powered on at a user's home or business 110, provisioning manager 212 is activated, which interacts with a reciprocal Auto-Configuration Server (ACS) 218 located in a carrier core network 220 (carrier core network 220 may be considered to be part of network 102), in order to register cellular converter module 104 with network 102 (i.e., activate SIM 216 or other circuitry inside cellular converter module 104, and provide authentication credentials (such as Ki and OPc values) and other provisioning information (such as IMS configuration information) to cellular converter module 104 so that cellular communication module 104 can initiate and receive data and/or voice calls over network 102. Other provisioning methods could be used alternatively, such as OMA-DM, BIP-HTTPS, or other provisioning methods/protocols, and management agent 212 inside cellular converter module 104 is configured accordingly. Once cellular converter module 104 has been provisioned for use on network 102, a 3G account maintained by a 3G network provider is typically deactivated.

After being provisioned to operate over network 102 as described above, cellular converter module 104 then initiates a communication with independent ACS server 222, typically over network 102, in order to retrieve 3G authentication credentials for cellular converter module 104 to authenticate 3G device 100 before each data and/or voice call initiated by 3G device 100. Independent ACS server 222 is typically maintained by a third party. In response to receiving contact from cellular converter module 104, the independent third party server 220 may contact the ACS server 218, which provides the 3G authentication credentials (i.e., Ki and OPc values) to independent ACS server 222, based on an identification of 3G device 100 as provided by the cellular converter module 104 (i.e., IMSI, phone number, IP address that was manually provisioned prior to shipment of cellular converter module 104 to each customer). The independent ACS server 222 than provides the 3G authentication credentials to cellular converter module 104, and cellular converter module 104 stores the 3G authentication credentials in electronic memory 206 for later authentication with 3G device 100.

During operation when the 3G network is still active, 3G device 100 authenticates itself each time that 3G device 100 needs to communicate with the 3G core network. This is achieved by 3G device 100 initiating a connection with an authentication server inside the 3G core network. When the 3G network is deactivated (including the core 3G network), 3G device 100 will need to somehow authenticate itself to an entity different than the 3G core network authentication server, since this server will likely also be deactivated after the 3G network is disabled.

If cellular converter module 104 has been provisioned while the 3G network is still operational, the next time that 3G device 100 attempts to communicate directly with the 3G core network, the 3G core network will reject the connection attempt by transmitting an indication to 3G device 100 over the 3G network. As part of normal 3G protocols, 3G device 100 will then search for another 3G base station through which to communicate. 3G device 100 will discover cellular converter module 104 as a valid 3G base station and register with cellular converter module 104 as a connected 3G device, using common 3G protocols. Cellular converter module 104 may emit one or more signals that mimic signals produced by a 3G cell tower via 3G radio 200 in order for 3G device 100 to discover, and to register with, in accordance with 3G cellular protocols.

When 3G device 100 attempts to register with cellular converter module 104 as a valid 3G device, cellular converter module 104 will check to determine whether 3G device 100 is authorized to register with cellular converter module 104. This is achieved by security agent 210 of cellular converter module 104 comparing an identification of 3G device 100 sent by 3G device 100 during this registration process (such as a IMSI, MSISDN, a MAC address, etc.) to data received from TR069 ACS 224 of ACS 218 in the 4G core network 220 and stored in electronic memory 206 of cellular converter module 104 (generally, as part of security agent 210). In an embodiment, cellular converter module 104 can only register one 3G device as identified in the communication with independent ACS server 222. If a match is determined, 3G device 100 becomes registered, in one embodiment as the only one permitted to be registered, with cellular converter module 104 as a valid 3G device, and any future communication attempts by 3G device 100 will be directed to cellular converter module 104, rather than a base station of the 3G network, if it is still operational. Alternatively, or in addition, security agent 210 sends an authentication token and a random number to 3G device 100, where the authentication token is generated using a secret key Ki, a randomly-generated number by security agent 210, and a sequence number applied to a cryptographic algorithm. The Ki value and cryptographic algorithm is known to both security agent 210 and 3G device 100. One of the results from the encryption algorithm is a result XRES, and XRES is stored in electronic memory 206 for later comparison to a RES value generated by 3G device 100. Both the authentication token and the random number are then transmitted to 3G device 100. 3G device 100, in turn, executes an authentication algorithm using a Ki value stored in its SIM card and the random number received from security agent 210 is used to generate a result RES. 3G device 100 then sends the RES back to cellular converter module 104, and security agent 210 verifies that the RES matches the XRES stored previously in electronic memory 206. Assuming a match, security agent 210 may then send a message to 3G device 100 indicating that further transactions between 3G device 100 and cellular converter module 104 should be encrypted.

In addition to 3G device 100 registering with cellular converter module 104 as described above, cellular converter module 104 generally authenticates itself to network 102 each time it initiates communications with network 102 on behalf of 3G device 100 (i.e., as a result of 3G device 100 initiating a communication). In 4G networks, such authentication is performed in accordance with well-known UMTS or CDMA2000 protocols using the LTE modem/transceiver 214 and SIM information stored on SIM 216.

As mentioned above, when cellular converter module 104 is powered up for the first time, provisioning occurs, where cellular converter module 104 is provided information from core network 220 relevant to the operation of cellular converter module 104 over network 102. Then, cellular converter module 104 obtains 3G authentication credentials and, in some cases, 3G operating information (e.g., permitted cellular operating bands, frequencies, time slots, codes, etc.) from either ACS 218 and/or from independent ACS server 222 that allow cellular converter module 104 to authenticate 3G device 100 each time that 3G device initiates a communication with cellular converter module 104.

In one embodiment, some or all of the 3G authentication and 3G operating information may be stored in independent ACS server 222, which may be maintained by a third party, such as a service provider of 3G device 100, using a service provider server 116, i.e., a home security provider such as ADT or any other entity that knows an identification of each 3G device, and its location, that is currently in service. Cellular converter module 104 is typically provisioned with certain identification information (such as an IMSI, IMEI, etc.), of a particular 3G device 100 it is authorized to communicate with. This information is also present inside 3G device 100 (i.e., stored on SIM 216 or other circuitry). In response to a request from cellular converter module 104, the independent ACS server 222 may contact the ACS 218 for some or all of the 3G authentication/operating information related to a particular 3G device co-located with cellular converter module 104. The 3G authentication/operating information may comprise authentication credentials, a telephone number and/or IP address for use by 3G device 100 when contacting a security monitoring center when the 3G device wishes to make a data and/or voice call, and/or one or more encryption algorithms.

In one embodiment, in response to receiving the 3G authentication/operating information from independent ACS server 222, cellular converter module 104 may generate and send a message to 3G device 100 to indicate that service from the 3G network has been discontinued. For example, cellular converter module 104 may "spoof" the base station that is responsible for 3G communications with 3G device 100, and send a SystemInformationBlockType1 message (and/or SystemInformationBlockType1-BR message and/or SystemInformationBlockType1-NB message) by means of a cellBarred or cellBarred-CRS field. In response, 3G device 100 stops communicating with the 3G base station, performs a scan to detect cellular converter module 104 and then performs a registration with cellular converter module 104, so that future communications to and from 3G device 100 are routed through cellular converter module 104 and network 102.

In some embodiments, some or all of the provisioning information and/or 3G authentication/operating information described above may be pre-loaded into cellular converter module 104 by 3G service provider 114 prior to shipment to customers.

When 3G device 100 initiates a communication with cellular converter module 104, many of the same signaling processes occur between 3G device 100 and cellular converter module 104 as an initial communication between 3G devices and a 3G cellular network. However, in an embodiment, as discussed above, authentication of 3G device 100 occurs at cellular converter module 104, rather than at an authentication center in a 3G core network or network 102. In a security setting, communications may be initiated by 3G device 100 upon detection of an event, such as detection that a door or window has opened while 3G device 100 is in an alarmed mode of operation, or when a user of 3G device 100 initiates a voice call with the remote monitoring center.

After authentication, a radio bearer may be established between 3G device 100 and cellular converter module 104, with cellular converter module 104 instructing 3G device 100 which frequency, channel, band, and/or power level to use.

When 3G device 100 begins transmitting data, either voice information or data (i.e., alarm codes), the data is received by 3G radio 200 in cellular converter module 104 and demodulated by baseband/RF modem 202 to form circuit-switched data in the form, for example, of PCM. Also, in an embodiment, an identification of a target destination (such as an identification of security monitoring center 112 in the form of, for example, a phone number or IP address) is provided to cellular converter module 104 (i.e., during either one of the provisioning processes). In this embodiment, cellular converter module 104 stores the target identification in electronic memory 206 and either replaces target identification provided by 3G device 100 with the one stored in electronic memory 206, or appends it to the data from 3G device 100 if no target identification was provided to cellular converter module 104 by 3G device 100.

The demodulated data from Baseband/RF modem 202 is next provided to IMS user agent 208 inside cellular converter module 104, where it is converted into IP-based packets. IMS signaling occurs between IMS user agent 208 and IMS system 228 located in the 4G core network 220 to set up a voice call or data transfer session. After setup is complete, the converted, IP-based data is provided by LTE modem 214 in cellular converter module 104 to network 102, then to IMS system 228 in the 4G core network 220, and then provided to the target destination (e.g., security monitoring center 112) via either MGW PSTN 230 or Internet module 232, using target identification information provided either by 3G device 100 or the one stored in electronic memory 206.

In some embodiments, cellular converter module 104 may comprise a backup battery to power cellular converter module 104 during AC power outages, as cellular converter module 104 is typically powered by household AC voltage. The backup battery may need to provide power to cellular converter module 104 for as much as 24 hours. Cellular converter module 104 may be capable of measuring the battery voltage to detect low battery conditions, and also capable of determining a battery test failure, i.e. if the battery can no longer hold a charge. In certain embodiments, cellular converter module 104 may notify security monitoring center 112 when the backup battery is low (such as after cellular converter module 104 has been running on battery power for a long period of time), or is no longer able to maintain a charge. In each case, cellular converter module 104 generates a low battery message. In one embodiment, the low battery message conforms to a low battery Contact ID code, as defined by Ademco, Inc. (now owned by Honeywell), i.e., 302 for low system battery and 309 for battery test failure. The low battery message is transmitted to security monitoring center 112 by identifying a telephone number or IP address stored in electronic memory 206 (received as part of the provisioning process) along with an identification of cellular converter module 104 that sent the message (i.e., IMSI, telephone number, IP address, etc.). In another embodiment, cellular converter module 104 learns the IP address of security monitoring center 112 or some other target destination by evaluating one or more previous messages sent by 3G device 100, in order to determine a target IP address as indicated by 3G device 100 during such messaging. Cellular converter module 104 may determine the target address from one or more of these messages, and stores it in electronic memory 206. Then, when cellular converter module 104 autonomously initiates a communication with security monitoring center 112, e.g., in order to send a low-battery message, it uses the IP address stored in electronic memory 206 as a target address.

At security monitoring center 112, the message is received and automatically identified as a low battery message and provided to attending personnel. In some embodiments, cellular converter module 104 comprises an indicator light and/or sound emitter for generating an alarm that a low battery condition exists.

In other embodiments, rather than transmitting a message to security monitoring center 112 directly upon detection of a low battery condition or battery test failure, cellular converter module 104 transmits a low battery indication to 3G device 100 using either a 3G communications protocol, or a separate transmitter that can communicate with 3G device 100 using a communication protocol other than 3G, such as a Z-wave, Zigbee, 433 Mhz, 435 Mhz, 319 Interlogix, BTLE 802.11 ah, or a WAN technology such as LORA, etc. In this embodiment, cellular converter module 104 is "learned" into 3G device 100 as a registered device, similar to how door sensors, motion sensors, and other security sensors and devices are registered with a 3G security panel. Upon detection of a low battery condition or battery test failure, cellular converter module 104 generates a message comprising an indication of a low battery condition and an identification of cellular converter module 104 (i.e., a serial number of cellular converter module 104, an ISMI or other identification information in the SIM 216) and transmits the message to 3G device 100. In response to receiving the message, 3G device 100 generates a low battery message containing an identification code (i.e., Contact ID code) of the low battery/test failure condition and an identification of cellular converter module 104. Then, the 3G device transmits a "normal" low battery signal comprising the Contact ID code and the identification information of cellular converter module 104 as a 3G signal to cellular converter module 104 for cellular converter module 104 to convert and transmit the low battery signal to network 102 and, ultimately, security monitoring center 112.

Transmission methods other than 3G (i.e., Z-wave, Zigbee, etc.) can also be used to transmit other information signals from cellular converter module 104 to the 3G device, such as supervisory signals and tamper alerts. In these cases, 3G device 100 may be configured to alert a user via an audible or visual alert displayed by 3G device 100, or some other device coupled to the 3G device, such as a security keypad.

In some embodiments, cellular converter module 104 can also include "listening" circuitry and firmware to detect certain events that occur within a residence or commercial space 110 proximate to cellular converter module 104. For example, cellular converter module 104 could comprise a microphone that converts nearby sounds into electrical signals to processor 204, where processor 204 evaluates the signals to determine, for example, that 3G device 100 is emitting an audible warning sound, that a siren coupled to 3G device 100 is emitting an audible warning sound, that a smoke or carbon monoxide alarm is sounding, that glass has been broken or, in general, that a commotion is occurring nearby cellular converter module 104. In one embodiment, cellular converter module 104 monitors for such commotion only when in a battery-operating state, i.e., in an embodiment where cellular converter module 104 comprises a backup battery and AC power has been lost. In such a state, various components of cellular converter module 104 may be powered off or put into a reduced-power mode of operation, and when cellular converter module 104 detects a commotion, the powered off/down components may be re-energized in order for cellular converter module 104 to receive 3G signals from 3G device 100 and/or to transmit information from 3G device 100 to network 102.

In one embodiment, cellular converter module 104 comprises a small, digital camera, which may generate digital images and/or video upon the occurrence of certain events, such as when cellular converter module 104 detects an audible commotion, as explained above. Such digital images and/or video can be sent by cellular converter module over network 102 and to security monitoring center 112, where personnel can evaluate the images and/or video to determine whether or not a condition exists inside residence/business 110 where an action should be taken, such as to dispatch authorities to the residence and/or contact a person associated with the 3G device 100 and/or cellular converter module 104 where such images/video originated. In other embodiments, the camera may constantly, or periodically, send the digital images and/or video across network 102 to security monitoring center 112 and/or to a person's mobile phone or computer associated with 3G device 100. In some embodiments, the images and/or video may be monitored by artificial intelligence software executed in cellular converter module 104, at security monitoring center 112 or on a user's mobile phone or computer to detect commotions occurring inside the residence and intelligently alert one or more third parties, such as the user, the user's family and/or friends, authorities, to inform the one or more third parties of the commotion.

Figure 3:
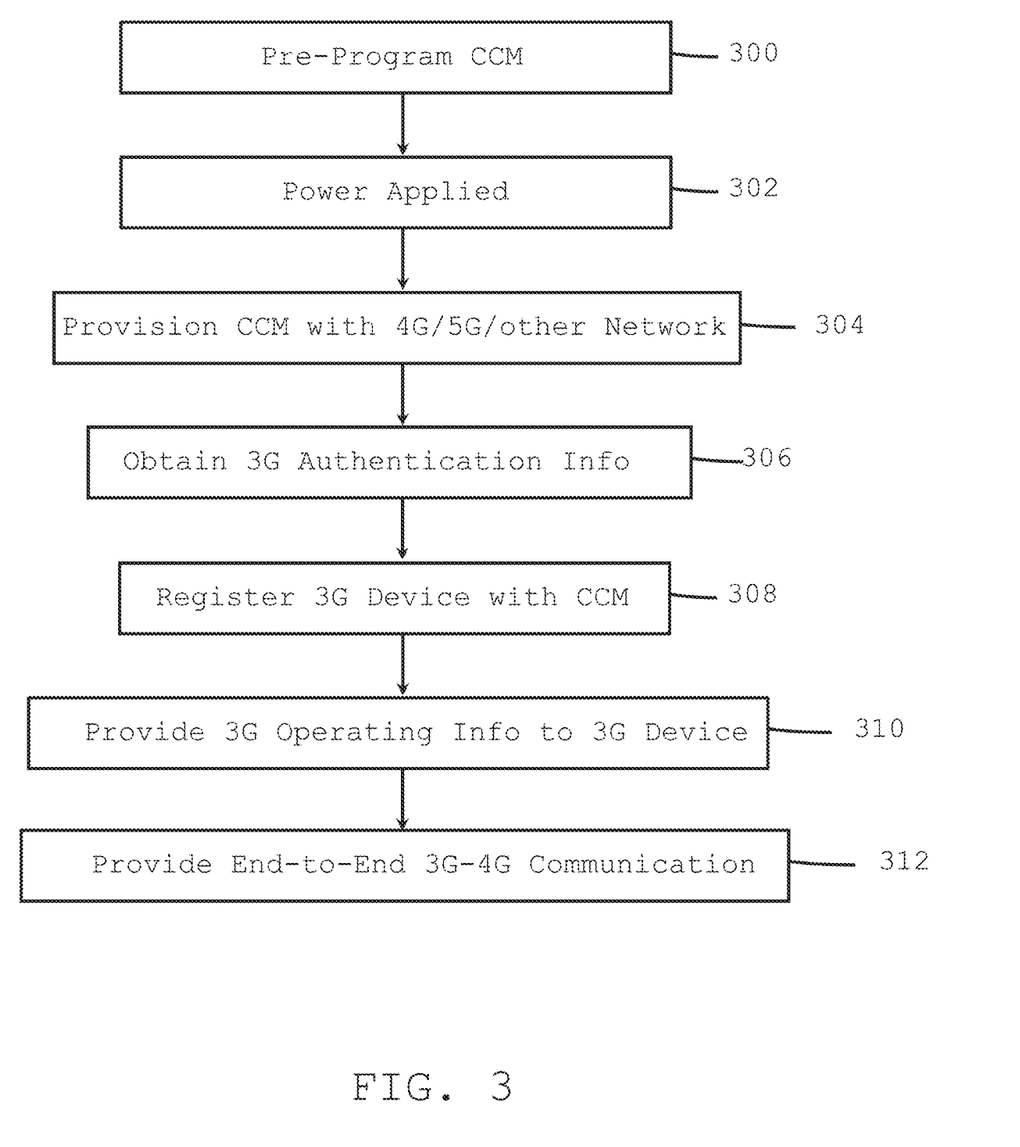
FIG. 3 is a flow diagram illustrating a method of operation of the cellular conversion module as shown in FIG. 1.

FIG. 3 is a flow chart showing steps of a method of how cellular converter module 104 operates.

In step 300, cellular converter module 104 may be pre-programmed with certain provisioning information for 3G device 100, such as an identification of cellular converter module 104, i.e., a serial number, phone number or IP address, etc., stored on SIM 216, and contact information of independent ACS server 222, generally stored in electronic memory 206. In one embodiment, each cellular converter module 104 is paired with a known, pre-installed 3G device 100 and, therefore, cellular converter module 104 may be pre-programmed to store a corresponding 3G device's identification information (MEID, IMSI, telephone number, etc.), operating bands and frequencies, etc.

In step 302, cellular converter module 104 is shipped to a user's home or business, and the user applies power to cellular converter module 104, typically by plugging cellular converter module 104 into a 120 VAC outlet.

In step 304, cellular converter module 104 is provisioned to operate on network 102. Cellular converter module 104 performs a provisioning process as explained previously, where cellular converter module 104 registers with network 102 as a valid 4G/5G/other device using the information stored on SIM 216.

In step 306, cellular converter module 104 next obtains authentication credentials and in some cases 3G operating information pertaining to 3G device 100. In this step, after registering with network 102, cellular converter module 104 contacts independent ACS server 222 over network 102, using contact information pre-stored in electronic memory 206. Cellular converter module 104 may provide its identification information to independent ACS server 222 so that independent ACS server 222 may obtain authentication and in some cases 3G operating information pertinent to the particular 3G device located in proximity to cellular converter module 104. Independent ACS server 222 may store a listing of cellular converter module identification information and related 3G device authentication information. When independent ACS server 222 is contacted by cellular converter module 104, it matches the identification information of the particular cellular converter module the list of identification information, and returns 3G authentication and, in some cases, other 3G operating information, pertinent with the particular 3G device pre-paired with the particular cellular converter module 104. In some cases, independent ACS server 222 does not store the 3G authentication and/or other 3G operating information within independent ACS server 222. In these cases, independent ACS server 222 contacts ACS server 218 within core network 220 in order to obtain this information, associated with the particular cellular converter module 104 that contacted independent ACS server 222 as explained earlier in this paragraph. The ACS server 222 returns the 3G authentication and 3G operating information to independent ACS server 222, which then forwards it to cellular converter module 104 via network 102. The 3G authentication information comprises one or more authentication keys, algorithms, a telephone number, IP address, MEID, IMSI, or other information typically used to authenticate devices in a cellular system and described earlier herein. The 3G operating information may comprise one or more cellular operating bands, frequencies, time slots, codes, etc. or, conversely, prohibited operating bands, frequencies, time slots, codes, etc. for the particular 3G device 100 to operate. Cellular converter module 104 then stores the 3G authentication information and 3G operating information, if any, in electronic memory 206.

In step 308, 3G device 100 registers with cellular converter module 104 after 3G device 100 is no longer able to communicate with a 3G cellular system, either because the 3G cellular system has been decommissioned, or if the 3G system has terminated an account associated with 3G device 100 (as a result, for example, of cellular converter module 104 registering with network 102 and/or receiving the 3G authentication information and 3G operating information in step 304). Cellular converter module 104 uses the 3G authentication information stored in memory 206 and registers 3G device 100, using standard 3G cellular communication protocols.

In step 310, cellular converter module 104 may provide the 3G operating information stored in memory 206 to 3G device 100 via 3G cellular protocols.

In step 312, after cellular converter module 104 has been registered with network 102 and 3G device has been registered with cellular converter module 104, 3G device may initiate a communication with a remote receiver, such as security monitoring center 112, as a result, in one example, of a security sensor monitored by 3G device 100 indicating an unauthorized intrusion into home/business 110.

First, cellular converter module 104 authenticates 3G device 100 after receiving an indication from 3G device 100 that 3G device desires to initiate a communication. Cellular converter module 104 then authenticates 3G device 100 using information provided by 3G device 100 as stored in a SIM card or circuitry of 3G device 100 and the 3G authentication information stored in memory 206.

Next, after 3G device 100 has been successfully authenticated to cellular converter module 104, cellular converter module 104 initiates a communication with network 102 using protocols in conformity with a wireless protocol used by network 102.

Next, after cellular converter module 104 has established a connection with network 102, cellular converter module 104 may convert the information from 3G device 100 (e.g., voice or data) into a format suitable for transmission to network 102. For example, data from 3G device 100 is downconverted and decoded into original form, then encoded, upconverted and transmitted to network 102 in conformance with protocols used by network 102.

Although some aspects have been described in the context of an apparatus, it is clear that these aspects also represent a description of the corresponding method, where a
> block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded/compressed signals can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier. Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein.

Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A method implemented by a cellular converter module for providing cellular service, the method comprising:
    performing a first provisioning function for provisioning first cellular communication circuitry associated with a first cellular communication protocol that is different from a second cellular communication protocol;
    performing a second provisioning function for provisioning second cellular circuitry associated with the second cellular communication protocol;
    receiving, from a cellular device using the second communication protocol, a first cellular signal according to the second cellular communication protocol;
    in response to the first cellular signal, authenticating the cellular device for communication with the cellular converter module using the second cellular communication protocol;
    receiving, from the cellular device, a second cellular signal according to the second cellular communication protocol;
    demodulating the second cellular signal to generate a demodulated cellular signal according to the second cellular communication protocol;
    converting the demodulated cellular signal into a plurality of data packets; and
    wirelessly transmitting, to a cellular network, the plurality of data packets using the first cellular communication protocol.

2. The method of claim 1, wherein the second cellular communication protocol is one of a third generation (3G) cellular communication protocol or a fourth generation long term evolution (4G LTE) communication protocol.

3. The method of claim 1, wherein the first cellular communication protocol is one of a fourth generation long term evolution (4G LTE) cellular communication protocol or a fifth generation (5G) cellular communication protocol.

4. The method of claim 1, further comprising receiving the second cellular signal from a security system according to the second cellular communication protocol, the second cellular signal indicates an event was detected by a security system during an armed state.

5. The method of claim 1, wherein the second provisioning function comprises provisioning based on the second cellular communication protocol.

6. The method of claim 1, further comprising powering-up of the cellular converter module; and
the first provisioning function for provisioning first cellular communication circuitry associated with the first cellular communication protocol occurring in response to the powering-up of the cellular converter module.

7. The method of claim 1, wherein the first provisioning function comprises registering with the cellular network using the first cellular communication protocol.

8. A cellular converter apparatus for providing cellular service, the cellular converter apparatus comprising:
a processor configured to:
perform a first provisioning function associated with a first cellular communication protocol that is different from a second cellular communication protocol that is used by a cellular device;
perform a second provisioning function associated with the second cellular communication protocol;
receive, from the cellular device using the second communication protocol, a first cellular signal according to the second cellular communication protocol; and
in response to the first cellular signal, authenticating the cellular device for communication with the cellular converter apparatus using the second cellular communication protocol;
a cellular receiver configured to receive, from the cellular device, a second cellular signal according to the second cellular communication protocol;
a modem in communication with the cellular receiver, the modem configured to demodulate the second cellular signal and convert the second cellular signal into a plurality of data packets; and
a transceiver in communication with the modem, the transceiver configured to wirelessly transmit, to a cellular network, the plurality of data packets using the first cellular communication protocol.

9. The cellular converter apparatus of claim 8, wherein the cellular second communication protocol is one of a third generation (3G) cellular communication protocol or a fourth generation long term evolution (4G LTE) cellular communication protocol.

10. The cellular converter apparatus of claim 8, wherein the first cellular communication protocol is one of a fourth generation long term evolution (4G LTE) cellular communication protocol or a fifth generation (5G) cellular communication protocol.

11. The cellular converter apparatus of claim 8, wherein the second provisioning function comprises provisioning based on the second cellular communication protocol.

12. The cellular converter apparatus of claim 8, wherein the cellular converter apparatus is configured to power-up; and
the first provisioning function associated with the first cellular communication protocol occurring in response to the power-up of the cellular converter apparatus, the first provisioning function comprises registering with the cellular network using the first cellular communication protocol.

13. The cellular converter apparatus of claim 8, wherein the cellular receiver is configured to receive the second cellular signal from a security system according to the second cellular communication protocol, the second cellular signal indicates an event was detected by a security system during an armed state.

14. A non-transitory computer-readable medium storing instructions that, when executed, perform a method, the method comprising:
performing a first provisioning function for provisioning first cellular communication circuitry associated with a first cellular communication protocol that is different from a second cellular communication protocol;
performing a second provisioning function for provisioning second cellular circuitry associated with the second cellular communication protocol;
receiving, from a cellular device, a first cellular signal according to the second cellular communication protocol;
in response to the first cellular signal, authenticating the cellular device for communication with a cellular converter module using the second cellular communication protocol;
receiving, from the cellular device using the second communication protocol, a second cellular signal according to the second cellular communication protocol;
demodulating the second cellular signal to generate a demodulated cellular signal according to the second cellular communication protocol;
converting the demodulated cellular signal into a plurality of data packets; and
wirelessly transmitting, to a cellular network, the plurality of data packets using the first cellular communication protocol.

15. The non-transitory computer-readable medium of claim 14, wherein the second cellular communication protocol is one of a third generation (3G) cellular communication protocol or a fourth generation long term evolution (4G LTE) cellular communication protocol.

16. The non-transitory computer-readable medium of claim 14, wherein the first cellular communication protocol is one of a fourth generation long term evolution (4G LTE) cellular communication protocol or a fifth generation (5G) cellular communication protocol.

17. The non-transitory computer-readable medium of claim 14, wherein the method further comprises authenticating with the cellular network using subscriber identity module (SIM) information.

18. The non-transitory computer-readable medium of claim 14, wherein the method further comprises receiving the second cellular signal from a security system according to the second cellular communication protocol, the second cellular signal indicates an event was detected by the security system during an armed state.

19. The non-transitory computer-readable medium of claim 14, wherein the method further comprises:
receiving a data signal from the cellular network using the first cellular communication protocol;
converting the data signal to a cellular data signal according to the second cellular communication protocol; and
wirelessly transmitting the cellular data signal to the cellular device.

20. The non-transitory computer-readable medium of claim 19, wherein the data signal comprises a firmware update for the cellular device.

* * * * *